US007836338B2

(12) United States Patent
Tsunakawa et al.

(10) Patent No.: US 7,836,338 B2
(45) Date of Patent: Nov. 16, 2010

(54) DISTRIBUTED TRANSACTION PROCESSING METHOD, DISTRIBUTED TRANSACTION PROCESSING SYSTEM, TRANSACTION MANAGEMENT DEVICE, AND COMPUTER PRODUCT

(75) Inventors: Takayuki Tsunakawa, Kawasaki (JP); Naohiro Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 11/807,334

(22) Filed: May 25, 2007

(65) Prior Publication Data
US 2008/0005220 A1 Jan. 3, 2008

Related U.S. Application Data

(63) Continuation of application No. PCT/JP2004/017733, filed on Nov. 29, 2004.

(51) Int. Cl.
G06F 11/00 (2006.01)
(52) U.S. Cl. .................. 714/16; 707/610; 707/611; 707/690
(58) Field of Classification Search .......... 714/16, 714/15, 17, 18, 19, 21; 707/202, 610, 611, 707/683, 689, 690
See application file for complete search history.

(56) References Cited

U.S. PATENT DOCUMENTS

| 5,319,773 A | 6/1994 | Britton et al. |
| 5,613,060 A | 3/1997 | Britton et al. |
| 5,799,305 A | 8/1998 | Bortvedt et al. |
| 6,202,079 B1 * | 3/2001 | Banks ........................ 718/101 |
| 6,295,610 B1 * | 9/2001 | Ganesh et al. ................. 714/19 |
| 6,510,421 B1 * | 1/2003 | Ganesh et al. ................. 707/1 |
| 6,772,363 B2 * | 8/2004 | Pedone et al. .................. 714/4 |
| 6,944,635 B2 * | 9/2005 | Kim et al. .................... 707/202 |
| 7,519,859 B2 * | 4/2009 | Ozawa et al. ................. 714/20 |
| 2004/0162859 A1 | 8/2004 | Guo et al. |

FOREIGN PATENT DOCUMENTS

| JP | 03-092945 | 4/1991 |
| JP | 04-064146 | 2/1992 |
| JP | 4-229333 | 8/1992 |
| JP | 06-259397 | 9/1994 |
| JP | 07-210436 | 8/1995 |
| JP | 07-262073 | 10/1995 |
| JP | 09-251412 | 9/1997 |
| JP | 10-506742 | 6/1998 |
| JP | 2000-047986 | 2/2000 |
| JP | 2004-252986 | 9/2004 |

* cited by examiner

Primary Examiner—Joshua A Lohn
(74) Attorney, Agent, or Firm—Greer, Burns & Crain, Ltd.

(57) ABSTRACT

A conductor transmits a commit processing request to directors in response to a commit request received from an application. Upon receipt of a response to the commit processing request from any one of the directors, the conductor notifies the application of a successful commit. If there is a pending transaction due to a failure in a director, the conductor instructs the director to process the pending transaction upon recovery from the failure. If a failure occurs in the conductor during transmission of the commit processing request and the commit processing request is not received by any of the directors, the conductor inquires the director whether there is a pending transaction after recovery from the failure, and instructs the director to process the pending transaction based on a processing result of the pending transaction obtained from another director.

5 Claims, 8 Drawing Sheets

FIG.8

| $D_1$: DOWN | $D_2$: DOWN | RESPONSE SENT TO APPLICATION | RESULT OF TRANSACTION | PROCESSING TO MAINTAIN CONSISTENCY |
|---|---|---|---|---|
| NOT DOWN | NOT DOWN | SUCCESSFUL | COMMIT | NONE |
| NOT DOWN | BEFORE COMMIT IS INSTRUCTED | SUCCESSFUL | COMMIT | $D_2$ KNOWS, AFTER BEING RESTARTED, THROUGH CONDUCTOR THAT COMMIT HAS BEEN COMPLETED IN $D_1$, AND PERFORMS COMMIT |
| NOT DOWN | DURING COMMIT PROCESSING | SUCCESSFUL | COMMIT | $D_2$ KNOWS, AFTER BEING RESTARTED, THROUGH CONDUCTOR THAT COMMIT HAS BEEN COMPLETED IN $D_1$, AND PERFORMS COMMIT |
| NOT DOWN | BEFORE COMMIT RESPONSE IS MADE | SUCCESSFUL | COMMIT | NONE |
| BEFORE COMMIT IS INSTRUCTED | BEFORE COMMIT IS INSTRUCTED | FAILED | ROLLBACK | $D_1$ AND $D_2$ KNOW, AFTER BEING RESTARTED, THROUGH CONDUCTOR THAT THERE IS NO DIRECTOR IN WHICH COMMIT HAS BEEN COMPLETED, AND PERFORM ROLLBACK |
| BEFORE COMMIT IS INSTRUCTED | DURING COMMIT PROCESSING | UNKNOWN | ROLLBACK | $D_1$ AND $D_2$ KNOW, AFTER BEING RESTARTED, THROUGH CONDUCTOR THAT THERE IS NO DIRECTOR IN WHICH COMMIT HAS BEEN COMPLETED, AND PERFORM ROLLBACK |
| BEFORE COMMIT IS INSTRUCTED | BEFORE COMMIT RESPONSE IS MADE | UNKNOWN | COMMIT | $D_1$ KNOWS, AFTER BEING RESTARTED, THROUGH CONDUCTOR THAT COMMIT HAS BEEN COMPLETED IN $D_2$, AND PERFORMS COMMIT |
| DURING COMMIT PROCESSING | DURING COMMIT PROCESSING | UNKNOWN | ROLLBACK | $D_1$ AND $D_2$ KNOW, AFTER BEING RESTARTED, THROUGH CONDUCTOR THAT THERE IS NO DIRECTOR IN WHICH COMMIT HAS BEEN COMPLETED, AND PERFORM ROLLBACK |
| DURING COMMIT PROCESSING | BEFORE COMMIT RESPONSE IS MADE | UNKNOWN | COMMIT | $D_1$ KNOWS, AFTER BEING RESTARTED, THROUGH CONDUCTOR THAT COMMIT HAS BEEN COMPLETED IN $D_2$, AND PERFORMS COMMIT |
| BEFORE COMMIT RESPONSE IS MADE | BEFORE COMMIT RESPONSE IS MADE | UNKNOWN | COMMIT | NONE |

US 7,836,338 B2

DISTRIBUTED TRANSACTION PROCESSING METHOD, DISTRIBUTED TRANSACTION PROCESSING SYSTEM, TRANSACTION MANAGEMENT DEVICE, AND COMPUTER PRODUCT

This application is a continuing application, filed under 35 U.S.C. §111(a), of International Application No. PCT/JP2004/017733, filed Nov. 29, 2004.

BACKGROUND OF THE INVENTION

1. Field of the Invention

The present invention relates to a technology for transaction distribution.

2. Description of the Related Art

In conventional distributed transaction processing, when one transaction is to be processed, it is necessary to access a plurality of databases, and two-phase commit is used to ensure consistency between databases.

In the two-phase commit, commit processing is divided into two phases. It is checked in the first phase whether the commit has been prepared in databases (prepare phase), and the commit is executed in the second phase only when it is checked that the commit has been prepared in all the databases. In any other cases, rollback is performed in the second phase to ensure consistency between the databases. Reference may be had to, for example, "Let's try distributed transaction!" [Searched on Oct. 12, 2004], Internet<URL: HYPERLINK "http://www.microsoft.com/japan/enable/training/kblight/t00 4/7/01.htm"http://www.ogisri.co.jp/otc/hiroba/technical/DTP/step2>.

In the two-phase commit, however, because the commit processing is performed in the two phases, the processing is inefficiently performed. Moreover, when a failure occurs in a computer that executes a transaction manager for managing distributed transaction processing, a transaction log is required that the transaction manager uses for recovery processing. A burden of introduction and management of the transaction log is substantial.

SUMMARY OF THE INVENTION

It is an object of the present invention to at least partially solve the problems in the conventional technology.

According to an aspect of the present invention, a transaction management device that requests a plurality of processing devices to perform distributed processing of a transaction received from an application, and includes a commit requesting unit, a notifying unit, and a recovery requesting unit. The processing devices unfailingly perform, when not in failure, commit processing in response to a request and returning a response to the request. The commit requesting unit sends a commit processing request to the processing devices in response to a commit request received from the application to request the processing devices to perform commit processing. The notifying unit notifies the application of a successful commit upon receipt of a response to the commit processing request from any one of the processing devices. The recovery requesting unit monitors a first processing device that has not respond to the commit processing request due to a failure, inquires the first processing device whether there is a pending transaction when the first processing device recovers from the failure, and requests, when there is a pending transaction, the first processing device to perform processing for the pending transaction based on a processing result obtained from a second processing unit.

According to another aspect of the present invention, a distributed transaction processing system includes a plurality of processing devices that performs distributed processing for one transaction, and a transaction management device that receives a transaction from an application and requests the processing devices to perform distributed processing of the transaction. The transaction management device includes a commit requesting unit that sends a commit processing request to the processing devices in response to a commit request received from the application to request the processing devices to perform commit processing a notifying unit that notifies the application of a successful commit upon receipt of a response to the commit processing request from any one of the processing devices, and a recovery requesting unit that monitors a first processing device that has not respond to the commit processing request due to a failure, inquires the first processing device whether there is a pending transaction when the first processing device recovers from the failure, and requests, when there is a pending transaction, the first processing device to perform processing for the pending transaction based on a processing result obtained from a second processing unit. Each of the processing devices includes a commit processing unit that unfailingly performs, when the processing device is not in failure, the commit processing in response to the commit processing request and sends the transaction management device a response to the commit processing request, and a recovery processing unit that performs processing for a pending transaction when the processing device recovers from a failure in response to a request from the transaction management device.

According to still another aspect of the present invention, a distributed transaction processing method for requesting a plurality of processing devices to perform distributed processing of a transaction received from an application, the processing devices unfailingly performing, when not in failure, commit processing in response to a request and returning a response to the request, includes receiving a commit request from the application, sending a commit processing request to the processing devices in response to the commit request to request the processing devices to perform commit processing, notifying the application of a successful commit upon receipt of a response to the commit processing request from any one of the processing devices, monitoring a first processing device that has not respond to the commit processing request due to a failure, inquiring, when the first processing device recovers from the failure, the first processing device whether there is a pending transaction, and requesting, when there is a pending transaction, the first processing device to perform processing for the pending transaction based on a processing result obtained from a second processing unit.

According to still another aspect of the present invention, a distributed transaction processing method applied to a distributed transaction processing system including a plurality of processing devices that performs distributed processing for one transaction, and a transaction management device that receives a transaction from an application and requests the processing devices to perform distributed processing of the transaction, includes the transaction management device receiving a commit request from the application, the transaction management device sending a commit processing request to the processing devices in response to the commit request to request the processing devices to perform commit processing, the processing devices unfailingly performing, when not in failure, the commit processing in response to the commit processing request and sending the transaction management device a response to the commit processing request, the transaction management device notifying the application of a successful commit upon receipt of a response to the commit processing request from any one of the processing devices, the transaction management device monitoring a first processing device that has not respond to the commit processing request due to a failure, the transaction management device inquiring, when the first processing device recovers from the failure, the first processing device whether there is a pending transaction, the transaction management device requesting, when there is a pending transaction, the first processing device to perform processing for the pending transaction based on a processing result obtained from a second processing unit, and the first processing device performing the processing for the pending transaction.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a table for explaining, when two directors perform distributed transaction processing, processing of maintaining consistency between databases corresponding to timing at which each of the directors is down.

DETAILED DESCRIPTION OF THE PREFERRED EMBODIMENTS

Exemplary embodiments of the present invention are explained in detail below with reference to the accompanying drawings.

Figure 1:
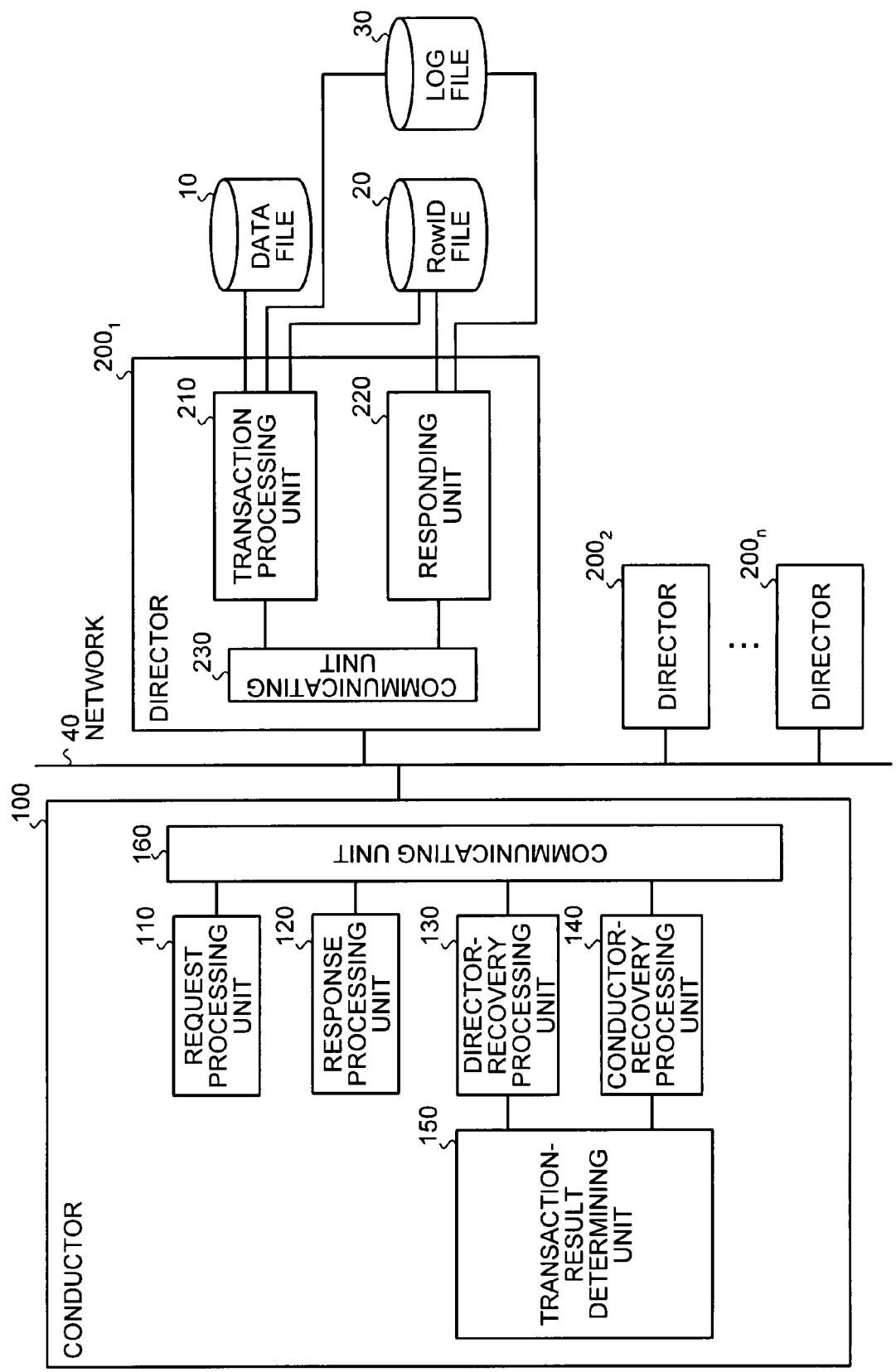
FIG. 1 is a functional block diagram of a distributed transaction processing system according to an embodiment of the present invention.

FIG. 1 is a functional block diagram of a distributed transaction processing system according to an embodiment of the present invention.

The distributed transaction processing system includes a conductor 100 that receives a transaction from an application, and n-pieces of directors $200_1$ to $200_n$ that perform distributed processing for the transaction received by the conductor 100, which are connected to each other through a network 40.

The conductor 100 is a device that instructs relevant directors to perform distributed processing for the transaction received from the application through the network 40, and that responds a processing result of the transaction to the application based on processing results of the directors.

In the distributed transaction processing system, the conductor 100 performs commit processing using one-phase commit. Further, it is assumed that the directors $200_1$ to $200_n$ can unfailingly perform the commit processing in response to a commit processing request, in any case other than one where the directors cannot perform the commit processing due to failure.

The conductor 100 includes a request processing unit 110, a response processing unit 120, a director-recovery processing unit 130, a conductor-recovery processing unit 140, a transaction-result determining unit 150, and a communicating unit 160.

The request processing unit 110 receives a transaction from an application and instructs relevant directors to perform distributed processing for the received transaction. The request processing unit 110 requests commit processing from relevant directors when a commit request is received from the application.

If all the relevant directors are down and the request for the commit processing cannot be received by any one of the directors, the request processing unit 110 informs the application that the commit is failed.

The response processing unit 120 receives the result of distributed processing for the transaction from the directors which the request processing unit 110 has instructed to perform the distributed processing for the transaction, and that informs the application of the transaction processing result based on respective distributed transaction processing results by the directors.

The response processing unit 120 informs the application that the commit is successful in response to reception of the response from any one of the directors to which the commit processing has been instructed by the request processing unit 110.

The response processing unit 120 also informs the application that the result of commit processing is unknown when no response is received, within a predetermined time, from any one of the directors to which the commit processing has been instructed by the request processing unit 110 or when all the directors to which the commit processing has been instructed are down after reception of the instruction for the commit processing.

The director-recovery processing unit 130 monitors, when there is any failed director in the directors $200_1$ to $200_n$, whether the failed director has been recovered, and performs recovery processing upon recovery of the failed director.

More specifically, the director-recovery processing unit 130 inquires the recovered director about a pending transaction, that is, as to whether it has a pending transaction for which the commit processing is not performed. When the recovered director has a pending transaction, the director-recovery processing unit 130 causes the transaction-result determining unit 150 to determine which processing is to be performed for the pending transaction, and instructs the recovered director to perform the determined processing. It is thereby possible to ensure the consistency between the databases even if there is any failed director during commit processing.

Namely, if receiving a response from any one of the directors, the response processing unit 120 immediately informs the application that the commit is successful. Even if there is any director, in the remaining directors, which is down after the commit processing request is received and before the response is sent to the conductor 100, the director can perform the commit processing after the recovery, and thus, the consistency between the databases can be ensured.

The conductor-recovery processing unit 140 performs recovery processing when the conductor 100 is down and then recovered. The conductor-recovery processing unit 140 performs processing for a pending transaction as part of the recovery processing.

More specifically, the conductor-recovery processing unit 140 inquires all the directors $200_1$ to $200_n$ as to whether they have a pending transaction. If a certain director makes a response to the inquiry that the director has a pending transaction, then the conductor-recovery processing unit 140 causes the transaction-result determining unit 150 to determine which processing is to be preformed for the pending transaction, and instructs the director having made the response to perform the determined processing. It is thereby possible to ensure the consistency between the databases even if the conductor 100 is down after transmission of the commit request to part of the directors $200_1$ to $200_n$.

The transaction-result determining unit 150 determines which processing is to be performed for a pending transaction according to instructions of the director-recovery processing unit 130 and the conductor-recovery processing unit 140.

More specifically, the transaction-result determining unit 150 inquires another director about a commit result for the pending transaction, and determines which processing is to be performed for the pending transaction based on the commit result of the other director.

Namely, when the other director performs commit processing for the pending transaction, the transaction-result determining unit 150 determines the commit processing as the processing to be performed for the pending transaction. When the other director performs rollback for the pending transaction, the transaction-result determining unit 150 determines the rollback as the processing to be performed for the pending transaction.

The communicating unit 160 performs communication with the computer that executes the application and the directors $200_1$ to $200_n$ through the network 40. The communicating unit 160 receives a commit request from the application and responses from the directors $200_1$ to $200_n$, and transmits a response as a commit result to the application and a commit processing request to the directors $200_1$ to $200_n$.

Each of the directors $200_1$ to $200_n$ is a device that manages each of a plurality of databases to which an access is required to process distributed transaction, and receives a transaction processing request from the conductor 100 and performs distributed processing for the transaction. It is noted that the directors $200_1$ to $200_n$ have the same configuration as one another, and thus, the director $200_1$ is explained below as an example.

The director $200_1$ includes a transaction processing unit 210, a responding unit 220, and a communicating unit 230.

The transaction processing unit 210 receives the transaction processing request from the conductor 100, performs distributed processing for the transaction, and updates a data file 10 that stores therein data in a record format.

The transaction processing unit 210 also updates a RowID file 20 that stores therein record storage locations in the data file 10, and a log file 30 that stores therein transaction logs.

Figure 2:
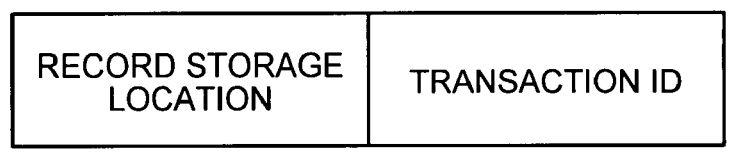
FIG. 2 is an example of a data structure of an entry created for each record in a RowID file shown in FIG. 1.

FIG. 2 is an example of a data structure of an entry created for each record in the RowID file 20. The entry includes a record storage location and a transaction ID.

The record storage location indicates a storage location of a record in the data file 10. The transaction ID is an identifier for identifying the transaction in which addition, deletion, or update of a record corresponding to the entry is last performed, and is updated by the transaction processing unit 210 when the processing of the transaction is completed.

Figure 3:
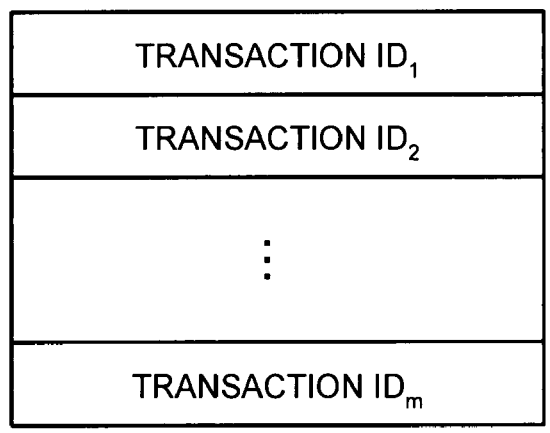
FIG. 3 is an example of a data structure of a pending transaction list included in a log file shown in FIG. 1.

FIG. 3 is an example of a data structure of a pending transaction list included in the log file 30. The pending transaction list contains transaction $ID_1$ to transaction $ID_m$ which are identifiers of m-pieces of transactions for which the commit processing is not performed.

The responding unit 220 receives an inquiry about the pending transaction from the conductor 100, and sends transaction IDs stored in the pending transaction list of the log file 30 to the conductor 100, as a response to the inquiry.

With the response of the pending transaction to the inquiry sent from the responding unit 220 to the conductor 100, the conductor 100 can specify the pending transaction that requires processing in the recovery processing of the director $200_1$ or of the conductor 100.

The responding unit 220 receives an inquiry about a commit result related to the pending transaction of the other director from the conductor 100, and sends a response to the inquiry to the conductor 100 using the pending transaction list of the log file 30 and the RowID file 20.

More specifically, the responding unit 220 receives a transaction ID of a pending transaction from the conductor 100, makes a response of Commit Incomplete if the transaction ID is in the pending transaction list, and checks whether the transaction ID is in the RowID file 20 if it is not in the pending transaction list. If the transaction ID is in the RowID file 20, this means that the transaction is committed, and thus the responding unit 220 makes a response of Commit Complete, and makes a response of Commit Incomplete if the transaction ID is not in the RowID file 20 because the transaction is not committed.

The responding unit 220 receives the inquiry about the commit result for the pending transaction of another director from the conductor 100, and sends a response, to the inquiry, as to whether the commit has been completed to the conductor 100 using the pending transaction list of the log file 30 and the RowID file 20. The conductor 100 can thereby determine the processing for the pending transaction of the other director.

The communicating unit 230 performs communication with the conductor 100 and the like through the network 40. For example, the communicating unit 230 receives a commit processing request and an inquiry about a pending transaction from the conductor 100, and transmits a commit result and a transaction ID of the pending transaction to the conductor 100.

Figure 4:
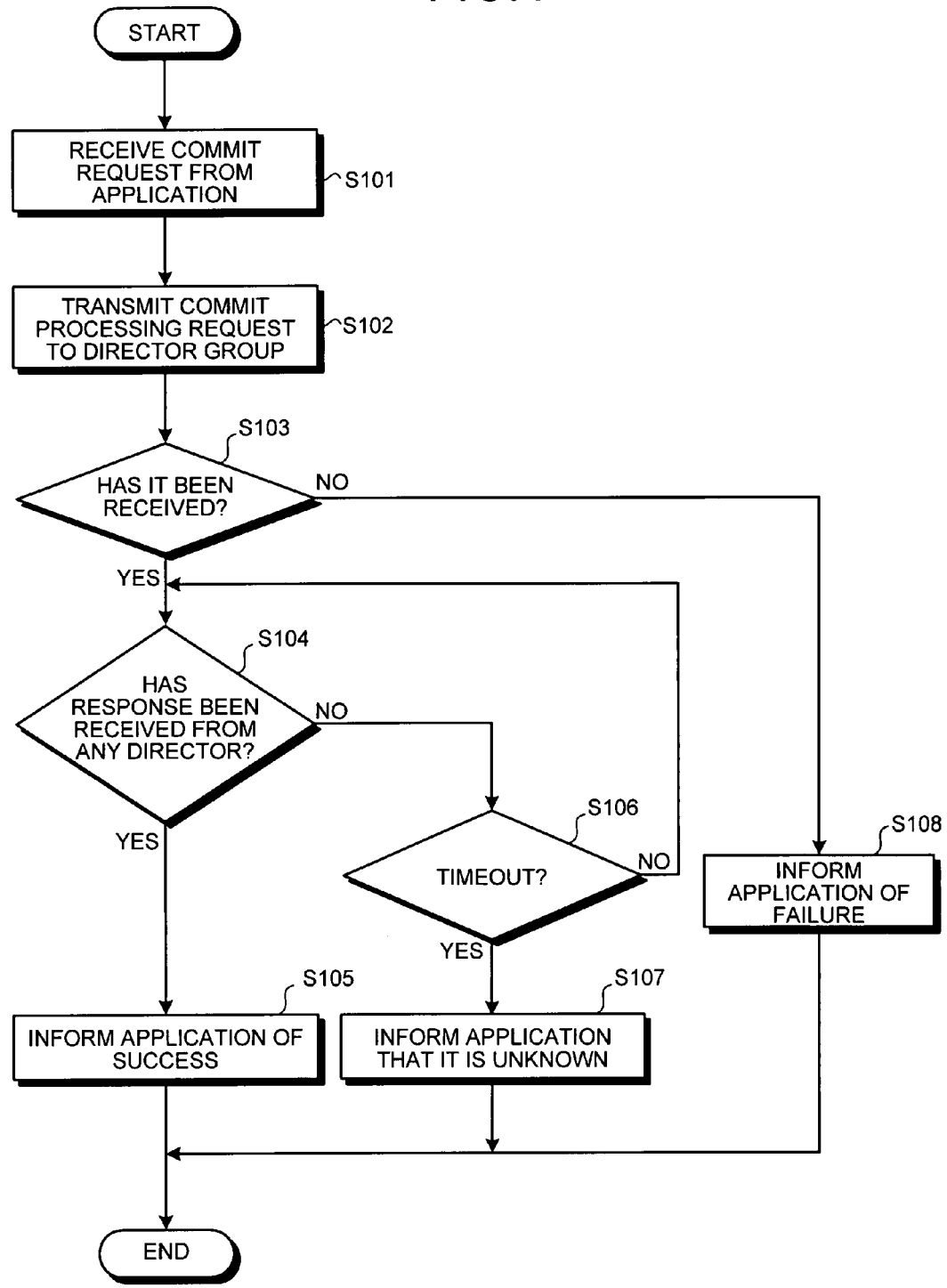
FIG. 4 is a flowchart of commit processing performed by a conductor shown in FIG. 1.

FIG. 4 is a flowchart of the commit processing performed by the conductor 100. In the conductor 100, the request processing unit 110 receives a commit request from the application (step S101), and transmits a commit processing request to a relevant director group (step S102).

The request processing unit 110 determines whether the commit processing request has been received by any one of directors in the director group (step S103). When the commit processing request has been received by none of them, it is determined that all the directors are down, and so, the request processing unit 110 informs the application that the commit is failed (step S108).

On the other hand, when the commit processing request has been received by any one of the directors, upon receiving a response to the commit processing request from the director (YES at step S104), the response processing unit 120 informs the application that the commit is successful (step S105). When no response has been received from the director, the response processing unit 120 checks timeout (step S106).

When the timeout has not expired, the response processing unit 120 continues to wait for a response from the director. When the timeout has expired, i.e., when directors that have received the commit processing request are down after receipt of the request, it is not known to which extent each director performs the commit processing. Therefore, the response processing unit 120 informs the application that the commit result is unknown (step S107).

As explained above, the conductor 100 transmits the commit processing request to the directors, and informs the application that the commit is successful immediately after reception of the response from any one of the directors. Therefore, the commit request from the application can be processed at high speed.

Figure 5:
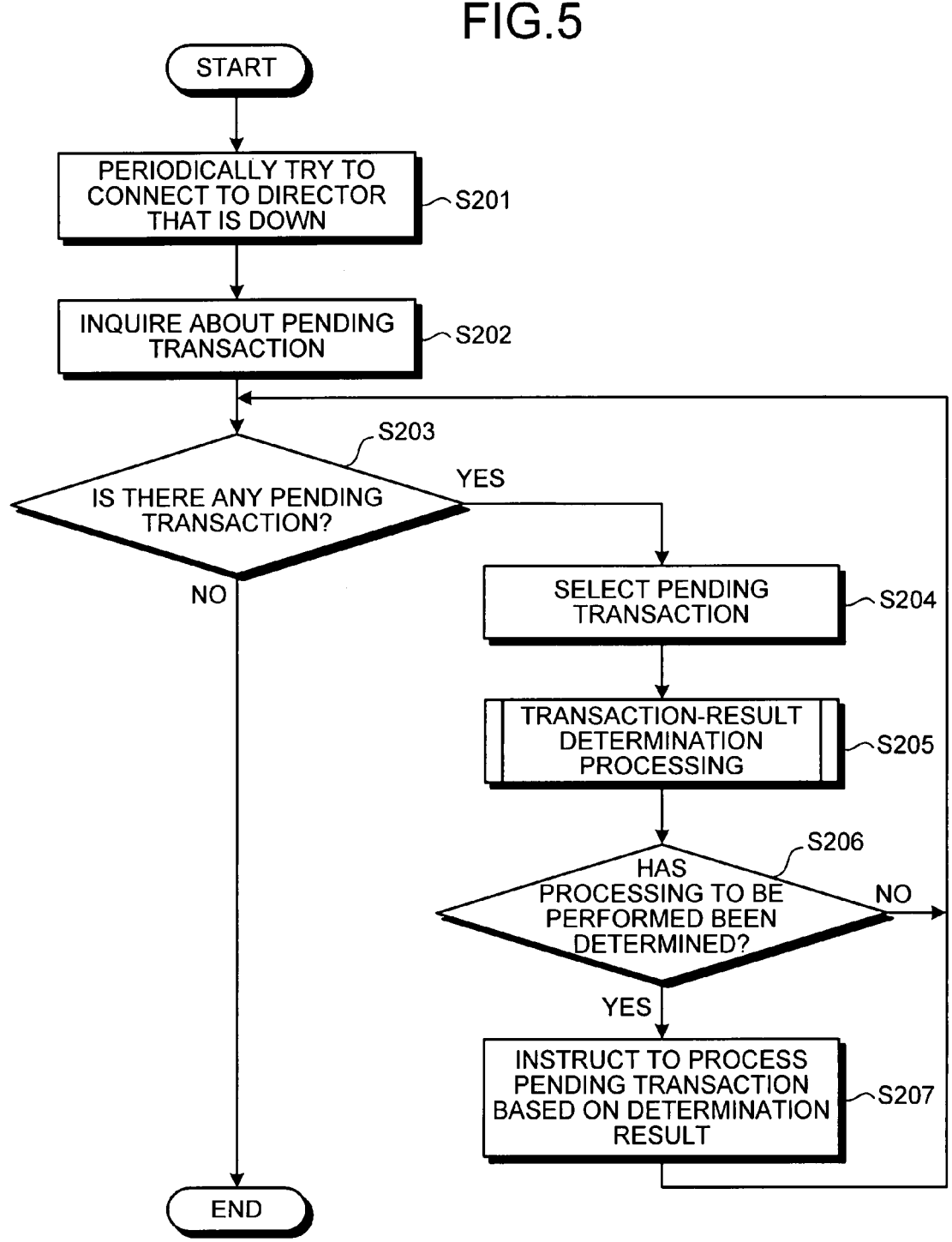
FIG. 5 is a flowchart of director recovery processing performed by a director-recovery processing unit shown in FIG. 1.

FIG. 5 is a flowchart of director recovery processing performed by the director-recovery processing unit 130.

When there is any director that is down, the director-recovery processing unit 130 periodically tries to connect to the director that is down (step S201). When successfully connecting thereto, the director-recovery processing unit 130 inquires the director about a pending transaction (step S202).

The director-recovery processing unit 130 determines whether there is any pending transaction (step S203). If any, the director-recovery processing unit 130 selects one pending transaction (step S204). The director-recovery processing unit 130 then performs transaction-result determination processing for determining which processing is to be performed for the selected pending transaction (step S205).

The director-recovery processing unit 130 determines whether processing, i.e., commit or rollback, to be performed for the pending transaction has been determined (step S206). When the processing, i.e., commit or the rollback, has been determined, the director-recovery processing unit 130 instructs the recovered director to process the pending transaction based on the determination result (step S207). Thereafter, the process control returns to step S203 to process the next pending transaction.

On the other hand, when it is unknown whether the processing to be performed is the commit or the rollback, the director-recovery processing unit 130 returns to the process at step S203 without instructing the recovered director about the pending transaction to process the next pending transaction.

As explained above, the director-recovery processing unit 130 determines processing for a pending transaction of a recovered director through the transaction-result determination processing, and instructs the recovered director about the determined processing. Thus, it is possible to correctly perform commit processing for the director that failed before performing the commit processing after recovery from the failure.

Figure 6:
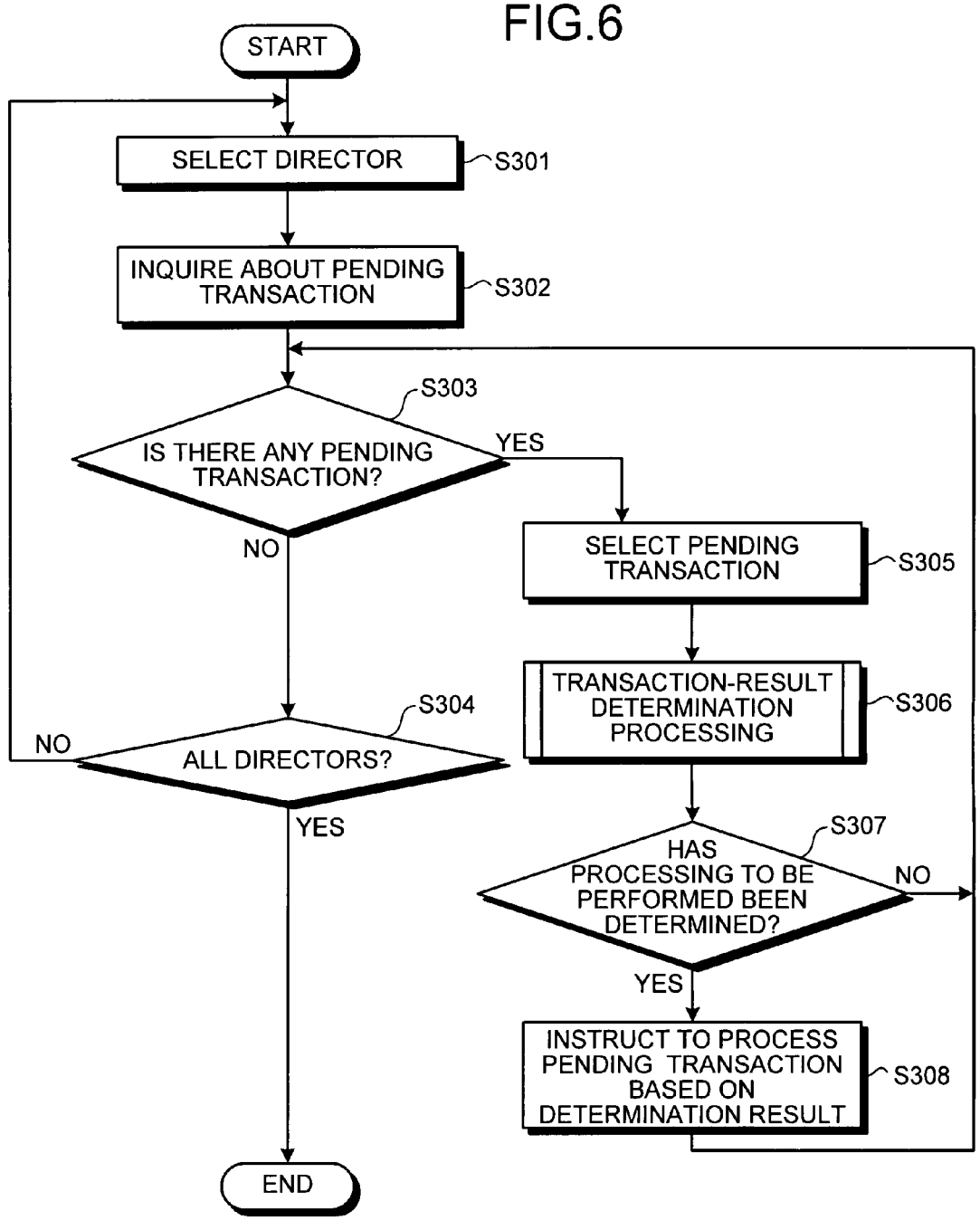
FIG. 6 is a flowchart of conductor recovery processing performed by a conductor-recovery processing unit shown in FIG. 1.

FIG. 6 is a flowchart of conductor recovery processing performed by the conductor-recovery processing unit 140.

The conductor-recovery processing unit 140 selects one director after the failure of the conductor is recovered (step S301), and inquires the director about a pending transaction (step S302).

The conductor-recovery processing unit 140 determines whether there is any pending transaction (step S303). When there is no pending transaction, the conductor-recovery processing unit 140 further determines whether the processing has been performed on all the directors (step S304). When the processing has not been performed on all the directors, the conductor-recovery processing unit 140 returns to the process at step S301 to select the next director. When the processing has been performed on all the directors, the process ends.

On the other hand, when there are pending transactions, the conductor-recovery processing unit 140 selects one of the pending transactions (step S305). The conductor-recovery processing unit 140 then performs the transaction-result determination processing for determining which processing is to be performed for the selected pending transaction (step S306).

The conductor-recovery processing unit 140 determines whether processing, i.e., commit or rollback, to be performed for the pending transaction has been determined (step S307). When the processing, i.e., commit or the rollback, has been determined, the conductor-recovery processing unit 140 instructs the selected director to process the pending transaction based on the determination result (step S308). Thereafter, the process control returns to step S303 to process the next pending transaction.

On the other hand, when it is unknown whether the processing to be performed is the commit or the rollback, the conductor-recovery processing unit 140 returns to the process at step S303 without instructing the selected director about the pending transaction to process the next pending transaction.

As explained above, the conductor-recovery processing unit 140 inquires a director about a pending transaction, determines processing to be performed for the pending transaction through the transaction-result determination processing, and instructs the director about the determined processing. Therefore, even if the conductor 100 is down after transmitting a commit request to directors, commit processing for directors that have not received the commit request can be correctly performed after the recovery of the conductor.

Figure 7:
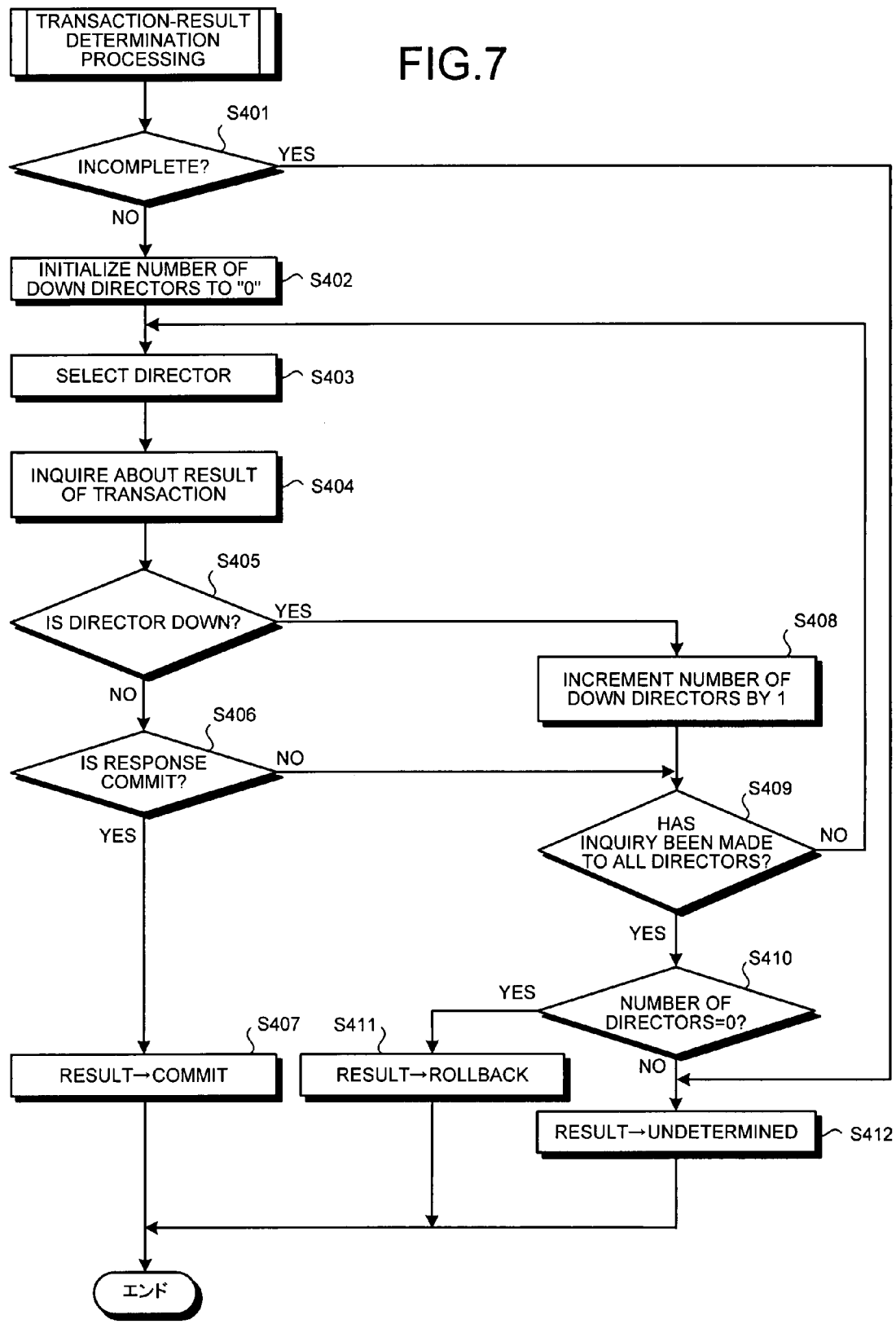
FIG. 7 is a detailed flowchart of transaction-result determination processing shown in FIGS. 5 and 6 performed by a transaction-result determining unit shown in FIG. 1.

FIG. 7 is a detailed flowchart of the transaction-result determination processing performed at step S205 of FIG. 5 and at step S306 of FIG. 6 by the transaction-result determining unit 150.

The transaction-result determining unit 150 determines whether the state of the pending transaction is incomplete (step S401). When the state of the pending transaction is incomplete, the process ends with the result as being undetermined (step S412).

On the other hand, when the state of the pending transaction is not incomplete, the transaction-result determining unit 150 initializes the number of down directors to "0" (zero) as a variable to count the number of down directors (step S402), and selects one of the directors (step S403).

The transaction-result determining unit 150 inquires the selected director about the processing result of pending transaction (step S404), and determines whether the director is down (step S405).

When the director is not down, the transaction-result determining unit 150 determines whether the response to the inquiry is Commit (step S406). When the response is Commit, the process ends with the result as Commit (step S407).

On the other hand, when the response to the inquiry is not Commit, the processing result of the pending transaction is Unknown, and it is necessary to inquire another director about it. Thus, the process control proceeds to step S409, where the transaction-result determining unit 150 determines whether the inquiry has been made to all the directors.

When the director is down at step S405, the transaction-result determining unit 150 increments the number of down directors by one (step S408), and determines whether the inquiry has been made to all the directors (step S409).

When the inquiry has not been made to all the directors, the process control returns to step S403 to select the next director. When the inquiry has been made to all the directors, the transaction-result determining unit 150 determines whether there is no down director (step S410).

When there is no down director, all the directors do not perform the commit, and thus, the process ends with the result as Rollback (step S411). When there is any down director, the processing result of the pending transaction by the down director is unknown, and thus, the process ends with the result as being undetermined (step S412).

As explained above, the transaction-result determining unit 150 sequentially inquires directors about a result of a pending transaction. When there is a director that performs a commit, the transaction-result determining unit 150 determines the result of the pending transaction as Commit, and determines it as Rollback when all the directors do not perform the commit. Thus, a log record of transaction processing results by the conductor 100 can be eliminated.

FIG. 8 is a table for explaining, when two directors perform distributed transaction processing, processing of maintaining consistency between the databases corresponding to timing at which each of the directors is down.

If two directors $D_1$ and $D_2$ are not down, then the response to the commit request sent to the application is that the commit is successful, and the result of transaction is Commit. Moreover, there is no need for processing to maintain consistency between the databases.

If the director $D_1$ is not down but the director $D_2$ is down, then the response to the commit request sent to the application is that the commit is successful irrespective of the timing at which the director $D_2$ is down, and the result of transaction is Commit.

However, before the director $D_2$ receives a commit instruction or if the director $D_2$ is down during commit processing, the director $D_2$ knows through the conductor 100 that the commit has been completed in the director $D_1$ after the director $D_2$ is restarted, and performs the commit. Furthermore, if the director $D_2$ is down before the commit response is made, then no processing is required to maintain consistency between the databases.

If the director $D_1$ is down before receiving the commit instruction and the director $D_2$ is also down before receiving the commit instruction, then the response to the commit request sent to the application is that the commit is failed, and the result of the transaction is Rollback. The directors $D_1$ and $D_2$ know, after being restarted, through the conductor 100 that there is no director in which the commit has been completed, and perform the rollback.

If the director $D_1$ is down before receiving the commit instruction and the director $D_2$ is down during the commit processing, then the response to the commit request sent to the application is Unknown, and the result of the transaction is Rollback. The directors $D_1$ and $D_2$ know, after being restarted, through the conductor 100 that there is no director in which the commit has been completed, and perform the rollback.

If the director $D_1$ is down before receiving the commit instruction and the director $D_2$ is down before sending the commit response, then the response to the commit request sent to the application is Unknown, and the result of the transaction is Commit. The director $D_1$ knows, after being restarted, through the conductor 100 that the commit has been completed in the director $D_2$, and performs the commit.

If the director $D_1$ is down during the commit processing and the director $D_2$ is also down during the commit processing, then the response to the commit request sent to the application is Unknown, and the result of the transaction is Rollback. The directors $D_1$ and $D_2$ know, after being restarted, through the conductor 100 that there is no director in which the commit has been completed, and perform the rollback.

If the director $D_1$ is down during the commit processing and the director $D_2$ is down before sending the commit response, then the response to the commit request sent to the application is Unknown, and the result of the transaction is Commit. The director $D_1$ knows, after being restarted, through the conductor 100 that the commit has been completed in the director $D_2$, and performs the commit.

If the director $D_1$ is down before sending the commit response and the director $D_2$ is also down before sending the commit response, then the response to the commit request sent to the application is Unknown, and the result of the transaction is Commit. Therefore, no processing is required to maintain consistency between the databases.

As explained above, according to the embodiment, the request processing unit 110 transmits a commit processing request to directors relevant to a commit request received from the application. When receiving a response from any one of the directors, the response processing unit 120 informs the application that the commit is successful. If a director is down and has a pending transaction, the director-recovery processing unit 130 instructs the director upon its recovery to perform the processing for the pending transaction based on the processing result of the pending transaction by another director. Therefore, the consistency between the databases can be maintained by using one-phase commit, and the commit processing can be speeded up.

If the conductor 100 is down during transmission of the commit processing request to the directors but the commit processing request cannot be received by part of the directors, the conductor-recovery processing unit 140 inquires the directors, after the conductor 100 is recovered, as to whether they have a pending transaction. If a director makes a response to the inquiry that it has a pending transaction, then the conductor-recovery processing unit 140 instructs the director having made the response to perform the processing of the pending transaction based on the processing result of another director with respect to the pending transaction responded from the director. Therefore, the consistency between the databases can be maintained by using one-phase commit, and the commit processing can thereby be speeded up.

In the embodiment, the conductor 100 performs the recovery processing by inquiring the directors about a pending transaction upon recovery from the failure of the conductor 100. Therefore, the conductor 100 does not need to hold the transaction log, which enables to reduce burden of system introduction and management.

The conductor and the directors are explained above as hardware; however, they can be implemented as software. In other words, a computer program (hereinafter, "conductor program") can be executed on a computer to realize the same function as the conductor. Similarly, a computer program (hereinafter, "director program") can be executed on a computer to realize the same function as the director. In the following, such a computer is explained.

Figure 9:
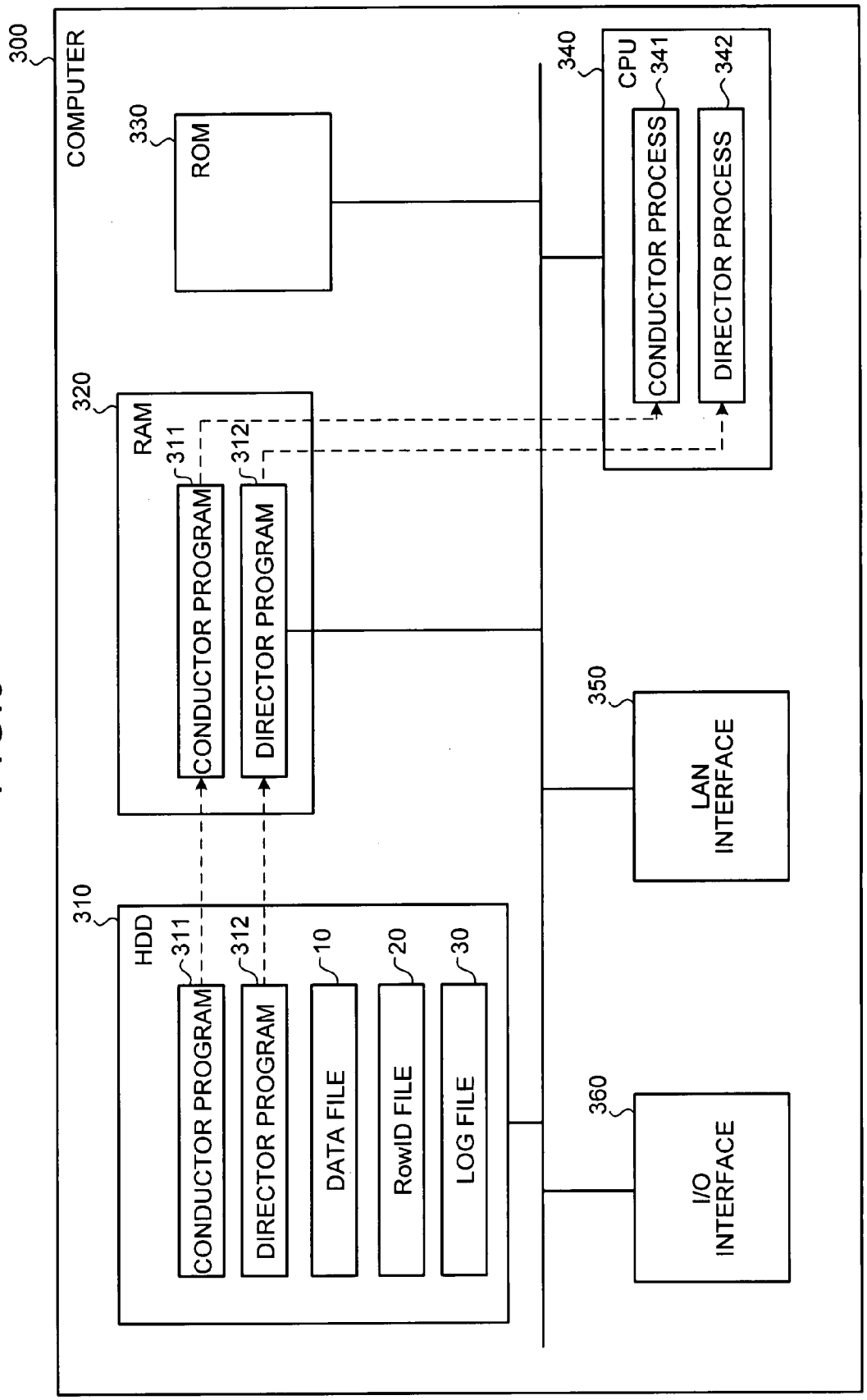
FIG. 9 a block diagram of a computer that executes a conductor program and a director program according to the embodiment.

FIG. 9 is a block diagram of a computer 300 that executes a conductor program 311 and a director program 312. It is noted that a case where the conductor program and the director program are executed by a single computer is explained below. However, the conductor program and the director program can also be executed by different computers. Moreover, the application and the conductor program can be executed by a single computer.

As shown in FIG. 9, the computer 300 includes a hard disk drive (HDD) 310, a random access memory (RAM) 320, a read only memory (ROM) 330, a central processing unit (CPU) 340, a local area network (LAN) interface 350, and an input-output (I/O) interface 360.

The HDD 310 is configured to store therein the conductor program 311 and the director program 312, and also the data file 10, the RowID file 20, and the log file 30 which are used by the director program 312.

The RAM 320 is configured to store therein the conductor program 311 and the director program 312 read from the HDD 310, and also the results of execution of the programs and the like. The ROM 330 is configured to store therein constants and the like.

The CPU 340 reads the conductor program 311 and the director program 312 from the RAM 320 and executes them as a conductor process 341 and a director process 342, respectively.

The LAN interface 350 connects the computer 300 to LAN (network), and the I/O interface 360 connects an input device, such as a keyboard and a mouse, and a display unit to the computer 300.

The conductor program 311 and the director program 312 executed by the computer 300 are stored in a transportable storage medium such as a flexible disk (FD), a compact disk read only memory (CD-ROM), a digital versatile disk (DVD), a magneto-optical disc, and an integrated circuit (IC) card, and are read from the storage medium to be installed on the computer 300.

The conductor program 311 and the director program 312 can be stored in a database of another computer connected to the computer 300 through the LAN interface 350, and downloaded from the database to the computer 300. Then, the conductor program 311 and the director program 312 are stored in the HDD 310.

As set forth hereinabove, according to an embodiment of the present invention, the consistency between databases can be maintained by using a one-phase commit. Thus, commit processing can be performed at high speed.

Moreover, only a processing device is required to manage a transaction log, which eliminates the need for management of the transaction log by a computer program (distributed transaction processing program). Therefore, it is possible to reduce burden of management of the transaction log.

Furthermore, when all processing devices, to which a commit processing request has been sent, fail, the response is quickly sent to an application. Therefore, the commit processing can be performed at high speed. The response can reliably be sent to the application even if all the processing devices fail after receiving the request. Therefore, the application can perform appropriate recovery operation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program for requesting a plurality of processing devices to perform distributed processing of a transaction received from an application, the computer program causing the computer to execute:
    receiving a commit request from the application;
    sending a commit processing request to the processing devices in response to the commit request to request the processing devices to perform commit processing;
    notifying the application of a successful commit upon receipt of a response to the commit processing request from any one of the processing devices;
    monitoring a first processing device that has not respond to the commit processing request;
    inquiring, when the first processing device recovers from a failure, the first processing device whether there is a pending transaction;
    obtaining, when there is a pending transaction, a processing result of the pending transaction from a second processing device; and
    requesting, when the processing result is successful, the first processing device to perform commit processing for the pending transaction.

2. The computer-readable recording medium according to claim 1, wherein
    the obtaining obtains processing results of the pending transaction from processing devices;
    the requesting requests, when none of the processing results are successful, the first processing device to perform rollback processing for the pending transaction.

3. The computer-readable recording medium according to claim 1, wherein
    the inquiring includes obtaining information on the pending transaction stored in a storing unit in the first processing device.

4. A transaction management device that requests a plurality of processing devices to perform distributed processing of a transaction received from an application, the transaction management device comprising:
    a commit requesting unit that sends a commit processing request to the processing devices in response to a commit request received from the application to request the processing devices to perform commit processing;
    a notifying unit that notifies the application of a successful commit upon receipt of a response to the commit processing request from any one of the processing devices; and
    a recovery requesting unit that monitors a first processing device that has not responded to the commit processing request, inquires the first processing device whether there is a pending transaction when the first processing device recovers from a failure, obtains a processing result of the pending transaction from a second processing device when there is a pending transaction, and requests, when the processing result is successful, the first processing device to perform commit processing for the pending transaction.

5. A distributed transaction processing method for requesting a plurality of processing devices to perform distributed processing of a transaction received from an application, the distributed transaction processing method comprising:
    receiving a commit request from the application;
    sending a commit processing request to the processing devices in response to the commit request to request the processing devices to perform commit processing;

notifying the application of a successful commit upon receipt of a response to the commit processing request from any one of the processing devices;

monitoring a first processing device that has not responded to the commit processing request;

inquiring, when the first processing device recovers from a failure, the first processing device whether there is a pending transaction;

obtaining, when there is a pending transaction, a processing result of the pending transaction from a second processing device; and requesting, when the processing result is successful, the first processing device to perform commit processing for the pending transaction.

* * * * *

UNITED STATES PATENT AND TRADEMARK OFFICE
CERTIFICATE OF CORRECTION

PATENT NO. : 7,836,338 B2
APPLICATION NO. : 11/807334
DATED : November 16, 2010
INVENTOR(S) : Tsunakawa et al.

Page 1 of 1

It is certified that error appears in the above-identified patent and that said Letters Patent is hereby corrected as shown below:

In the Claims:

Claim 1
Col. 12, Line 14    Delete "respond" and insert --responded-- in its place.

Signed and Sealed this
Twenty-second Day of February, 2011

David J. Kappos
*Director of the United States Patent and Trademark Office*